US012620889B2

(12) United States Patent
Olivares et al.

(10) Patent No.: US 12,620,889 B2
(45) Date of Patent: May 5, 2026

(54) BOOT UVLO DETECTION SCHEME FOR HIGH VOLTAGE APPLICATIONS

(71) Applicants: NEXPERIA B.V, Nijmegen (NL);
Nexperia Technology (Shanghai) Ltd.,
Shanghai (CN)

(72) Inventors: Jairo Olivares, Richardson, TX (US);
Alejandro Vera, Wylie, TX (US);
Mitchell Levine, Celina, TX (US)

(73) Assignees: NEXPERIA B.V, Nijmegen (NL);
Nexperia Technology (Shanghai) Ltd.,
Shanghai (CN)

( * ) Notice: Subject to any disclaimer, the term of this patent is extended or adjusted under 35 U.S.C. 154(b) by 232 days.

(21) Appl. No.: 18/620,256

(22) Filed: Mar. 28, 2024

(65) Prior Publication Data

US 2025/0309752 A1       Oct. 2, 2025

(51) Int. Cl.
| | |
|---|---|
| *H02M 1/32* | (2007.01) |
| *H02M 1/088* | (2006.01) |
| *H02M 3/00* | (2006.01) |
| *H02M 3/158* | (2006.01) |

(52) U.S. Cl.
CPC ............. *H02M 1/32* (2013.01); *H02M 1/088* (2013.01); *H02M 3/01* (2021.05); *H02M 3/158* (2013.01)

(58) Field of Classification Search
CPC ......... H02M 1/088; H02M 3/01; H02M 3/158

USPC ........................................................ 323/271
See application file for complete search history.

(56) References Cited

U.S. PATENT DOCUMENTS

| | | | | |
|---|---|---|---|---|
| 5,627,460 A | * | 5/1997 | Bazinet ................... | G05F 1/618 |
| | | | | 323/224 |
| 2015/0188425 A1 | * | 7/2015 | Chang .................... | H02M 3/158 |
| | | | | 323/271 |
| 2016/0043624 A1 | * | 2/2016 | Jarvinen ............... | H02M 3/158 |
| | | | | 323/271 |
| 2023/0246550 A1 | * | 8/2023 | Guerra ................ | H02M 1/0006 |
| | | | | 323/283 |

* cited by examiner

*Primary Examiner* — Yemane Mehari
(74) *Attorney, Agent, or Firm* — Ruggiero McAllister & McMahon LLC

(57) ABSTRACT

A buck converter including a high-side switch, a low-side switch and a bootstrap (BOOT), under-voltage lockout (UVLO) circuit. The BOOT UVLO circuit includes a BOOT UVLO detection element configured to compare a BOOT voltage with a switch node (SW) voltage to determine an occurrence of a BOOT UVLO event. The BOOT UVLO detection element is configured to output an UVLO signal (UVLO_Z), in case of the BOOT UVLO event. The BOOT UVLO circuit further includes a logic gate configured to receive the UVLO_Z and a high-side ON, (HSON) signal, the HSON signal is for controlling a switching of the high-side switch. The logic gate is configured to negate the HSON signal when receiving the UVLO_Z while the HSON signal is ON, to thereby immediately switch OFF the high-side switch when the HSON signal is ON.

17 Claims, 6 Drawing Sheets

500

600

BOOT UVLO DETECTION SCHEME FOR HIGH VOLTAGE APPLICATIONS

BACKGROUND

1. Field of the Disclosure

The present disclosure relates to buck converters. More specifically, the present disclosure relates to a bootstrap (BOOT) under-voltage lockout (UVLO) detection in a buck converter.

2. Description of the Related Art

A buck converter, also known as a step-down converter, is a type of direct current (DC) to DC converter circuit used to efficiently step down a higher input voltage to a lower output voltage. It is widely used in various applications such as power supplies, battery chargers and voltage regulators. The basic operation of a buck converter involves the controlled switching of a power transistor to regulate the output voltage.

In a power converter circuit, such as a buck converter, the bootstrap (BOOT) domain pertains to the voltage supply used to drive the high-side switching element, often a metal-oxide-semiconductor field-effect transistor (MOSFET) or an insulated gate bipolar transistor (IGBT). The high-side switch is responsible for controlling the flow of current from the input to the output in these converters.

The bootstrap circuit of the buck converter typically includes a bootstrap capacitor. The bootstrap capacitor provides a floating voltage supply to the high-side MOSFET driver to switch the input voltage to the load. During the OFF state of the high-side MOSFET the bootstrap capacitor charges up to value of the boot refresh rail. This is typically on the order of the max gate-source voltage ($V_{GS}$) that the high side FET can tolerate. This charging is usually accomplished through a diode connected between the input voltage and the bootstrap capacitor. When the high-side MOSFET is turned ON, the voltage across its gate and source needs to be higher than the input voltage to ensure proper conduction. The charge stored in the bootstrap capacitor provides this higher voltage, allowing the high-side MOSFET to switch effectively. The bootstrap capacitor must be large enough to supply the required gate charge during the entire ON time of the high-side MOSFET, ensuring continuous operation of the buck converter.

SUMMARY

A summary of aspects of certain examples disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects and/or a combination of aspects that may not be set forth.

The present disclosure presents an under-voltage lockout (UVLO) detection scheme and a scheme for bootstrap capacitor charging during UVLO for a BOOT domain of a buck converter. The solution of the present disclosure is particularly useful in high voltage applications. Advantageously, the solution of the present disclosure does not require any extra level shifters or other additional high voltage devices to detect and deal with UVLO events.

According to an aspect of the present disclosure, a buck converter is presented. The buck converter includes a high-side switch and a low-side switch. The buck converter may further include a BOOT UVLO circuit. The BOOT UVLO circuit may include a BOOT UVLO detection element configured to compare a BOOT voltage with a switch node (SW) voltage to determine an occurrence of a BOOT UVLO event. The BOOT UVLO detection element may be configured to output an UVLO signal (UVLO_Z) in case of the BOOT UVLO event. The BOOT UVLO circuit may further include a logic gate configured to receive the UVLO_Z and a high-side ON (HSON) signal, wherein the HSON signal is for controlling a switching of the high-side switch. The logic gate may be configured to negate the HSON signal when receiving the UVLO_Z while the HSON signal is ON, to thereby switch OFF the high-side switch when the HSON signal is ON.

In an embodiment, the buck converter may further include a gate driver circuit. An output of the logic gate may be input to the gate driver circuit. An output of the gate driver circuit may input to a gate of the high-side switch.

In an embodiment, a source of the high-side switch may be connected to the BOOT UVLO circuit via the SW.

In an embodiment, a gate of the high-side switch may be connected to an input of a high-side (HS) gate-source voltage ($V_{GS}$) detection element configured to detect whether the high-side switch is turned ON or OFF based on the $V_{GS}$. The $V_{GS}$ detection element may be configured to output a high-side OK (HSOK) signal indicative of the high-side switch being turned ON or OFF.

In an embodiment, the buck converter may further include a logic element. The logic element may be configured to detect, based on the HSOK signal, that the high-side switch is turned OFF while the HSON signal is ON. The logic element may further be configured to start a BOOT refresh algorithm when it is detected that the high-side switch is turned OFF while the HSON signal is ON.

In an embodiment, the BOOT refresh algorithm may be configured to sequentially switch ON the low-side switch using a low-side ON (LSON) signal (42), try to switch ON the high-side switch using the HSON signal, and determine, based on the HSOK signal, whether the high-side switch is turned ON.

In an embodiment, the BOOT refresh algorithm may be configured to repeat the sequential steps until it is determined, based on the HSOK signal, that the high-side switch is turned ON.

In an embodiment, the BOOT refresh algorithm may be configured to apply a first time delay after switching ON the low-side switch using the LSON signal and apply a second time delay after trying to switch ON the high-side switch using the HSON signal.

In an embodiment, the first time delay may be about 300 ns and the second time delay may be about 100 ns.

According to an aspect of the present disclosure, a method of detecting a BOOT UVLO event in a buck converter is presented. The method may include detecting, based on a HSOK signal indicative of a high-side switch of the buck converter being turned ON or OFF, that the high-side switch is turned OFF while a HSON signal for controlling the switching of the high-side switch is ON. The method may further include starting a BOOT refresh algorithm when it is detected that the high-side switch is turned OFF while the HSON signal is ON.

In an embodiment, the BOOT refresh algorithm may include sequentially performing a switching ON of a low-side switch of the buck converter using an LSON signal, a trying to switch ON the high-side switch using the HSON signal, and a determining, based on the HSOK signal, whether the high-side switch is turned ON.

In an embodiment, the BOOT refresh algorithm may further include repeating the sequential steps until it is determined, based on the HSOK signal, that the high-side switch is turned ON.

In an embodiment, the BOOT refresh algorithm may further include applying a first time delay after switching ON the low-side switch using the LSON signal and applying a second time delay after trying to switch ON the high-side switch using the HSON signal. The first time delay is, e.g., about 300 ns and the second time delay is, e.g., about 100 ns.

BRIEF DESCRIPTION OF THE DRAWINGS

Embodiments of the present disclosure will now be described, by way of example only, with reference to the accompanying schematic drawings in which corresponding reference symbol indicate corresponding parts, in which.

Figure 1:
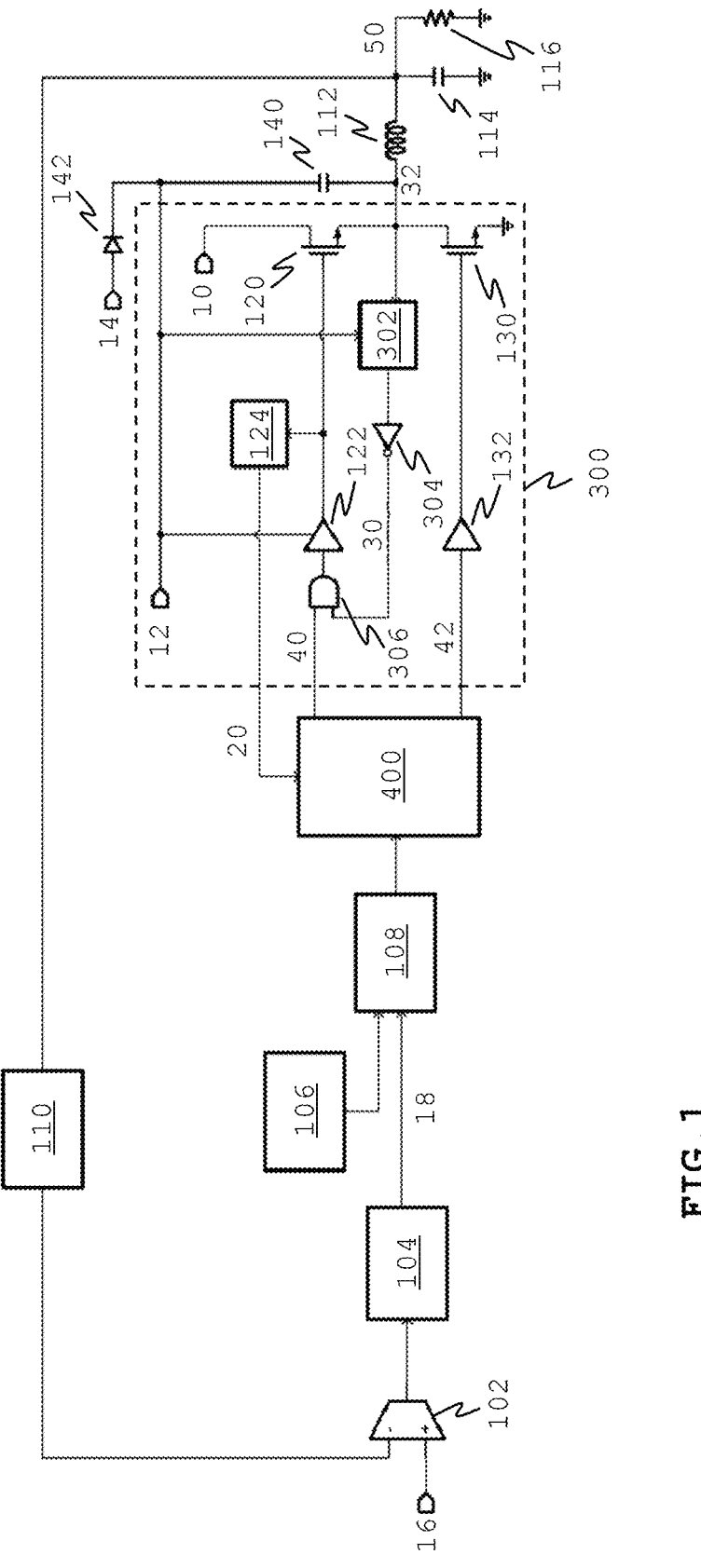
FIG. 1 shows a schematics of an example buck converter according to an embodiment.

The figures are intended for illustrative purposes only, and do not serve as restriction of the scope of the protection as laid down by the claims.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the present disclosure is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present disclosure should be or are in any single example of the present disclosure. Rather, language referring to the features and advantages is understood to mean that a specific feature, advantage, or characteristic described in connection with an embodiment is included in at least one embodiment of the present disclosure. Thus, discussions of the features and advantages, and similar language, throughout this specification may, but do not necessarily, refer to the same example.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure. Reference throughout this specification to "one embodiment," "an embodiment," or similar language means that a particular feature, structure, or characteristic described in connection with the indicated embodiment is included in at least one embodiment of the present disclosure. Thus, the phrases "in one embodiment," "in an embodiment," and similar language throughout this specification may, but do not necessarily, all refer to the same embodiment.

In a buck converter, a high-side MOSFET driver, e.g., an NMOS power FET, is generally used as a switch between a switch node (SW) and an input power supply providing an input voltage ($V_{in}$). To power the gate of this switch, a large capacitor (i.e., bootstrap capacitor) is used to create a floating pocket with the bottom plate tied to the source of the power FET. The voltage supplied by this floating capacitor may be monitored to ensure that there is enough voltage in the BOOT domain to properly turn on/off the high-side switch.

A UVLO monitoring circuit is usually placed within the BOOT domain to sense if the voltage of the BOOT pocket gets too low. Generally, it is necessary to use additional circuitry to be able to translate the BOOT UVLO signal from the high voltage domain to the low voltage domain for the converter logic to detect when a BOOT UVLO event occurs. This extra circuitry involves the need for high voltage devices, as well as causing additional delays before the converter logic can respond and shut off the high-side switch.

The present disclosure provides a solution that eliminates the need for such additional circuitry by using an innovative scheme to detect when a UVLO event occurs using logic and a high-side gate detect signal. This results in faster response and area savings.

FIG. 1 shows an example embodiment of a buck converter 100 according to the present disclosure. The buck converter 100 may include an error amplifier 102 having as inputs a loop reference voltage (Loop $V_{ref}$) 16 and a loop voltage from a feedback gain element 110. The output of the error amplifier 102 may be input to a compensation network element 104 to generate a compensation voltage ($V_{comp}$) 18. A modulator element 108 may receive the $V_{comp}$ 18 together with a slope compensation generated by a slope compensation element 106. Output of the modulator element 108 may be input to a logic element 400, which controls the operation of a high-side switch 120 and a low side-switch 130. When the high-side switch 120 is ON, the bootstrap capacitor 140 enables the high-side switch to provide input voltage ($V_{in}$) 10 to the switch node (SW) 32. The low-side switch 130 is then in an OFF state. When the high-side switch 120 is OFF, the low-side switch 130 is ON and the bootstrap capacitor 140 may be charged from the BOOT Refresh Rail voltage 14 and via diode 142. The output voltage ($V_{out}$) 50 may be generated via an inductor 112, which is typically connected to a capacitor 114 and a resistor (load) 116. $V_{out}$ may be looped back via the feedback gain element 110.

A BOOT UVLO circuit 300 is shown, which may include the high-side switch 120 and a gate driver circuit 122 for the high-side switch 120. The BOOT UVLO circuit 300 may further include the low-side switch 130 and a gate driver circuit 132 for the low-side switch 120. The high-side switch 120 may be controlled by a high-side on (HSON) signal 40 generated by the logic element 400. The low-side switch 130 may be controlled by a low-side on (LSON) signal 42 generated by the logic element 400. When the high-side switch 120 is ON, the high-side gate-source voltage (HS $V_{GS}$) may be detected by HS $V_{GS}$ detection element 124, which may output a high-side OK (HSOK) signal 20 to the logic element 400 to indicate whether the high-side switch 120 is in an ON state or in an OFF state.

A BOOT UVLO detection element 302 may detect a BOOT UVLO event by comparing a BOOT voltage 12 with the SW voltage 32. In case of a BOOT UVLO event, the BOOT UVLO detection element 302 may generate an UVLO_Z signal 30 that immediately triggers the high-side switch 120 to turn off. Hereto the UVLO_Z signal 30 may be compared against the HSON signal 40, e.g., using a logic gate 306 to negate the HSON signal 40 when the HSON signal is ON. In the example if FIG. 1, the UVLO_Z signal 30 is inverted via a NOT gate 304 and then input to a NAND gate 306 together with the HSON signal 40.

The logic element 400 may use the HSOK signal 20, which may be negated by the UVLO_Z signal 30, to control the high-side switch 120 and the low-side switch 130 to allow the bootstrap capacitor 140 to charge and discharge when needed. The operation of the BOOT UVLO circuit 300 and the logic element 400 will be discussed in more detail below.

Figure 2:
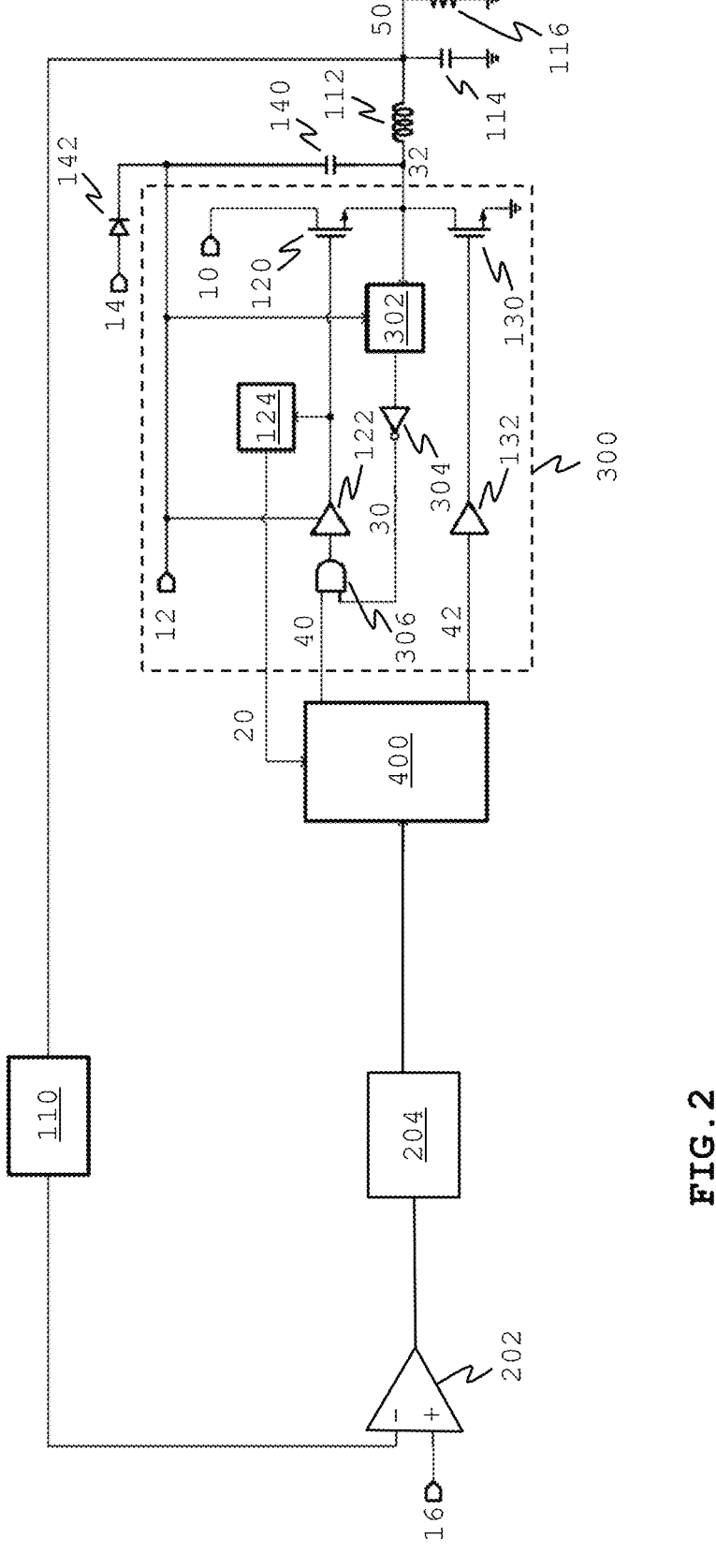
FIG. 2 shows a schematics of another example buck converter according to an embodiment.

FIG. 2 shows another example embodiment of a buck converter 200 according to the present disclosure. The buck converter 200 may include a loop comparator 202 having as inputs a loop reference voltage (Loop $V_{ref}$) 16 and a loop voltage from a feedback gain element 110. The output of the loop comparator 202 may be input to a constant on-time generator 204. Output of the constant in-time generator 204 may be input to a logic element 400, which controls the operation of a high-side switch 120 and a low side-switch 130. The further elements of the buck converter 200 of FIG. 2 are similar to the elements of the buck converter 100 of FIG. 1.

The present disclosure is not limited to buck converters as shown in FIG. 1 or FIG. 2. Other variants of buck converters may make use of the solution of the present disclosure, which is part of the BOOT UVLO circuit 300 and the logic element 400.

Figure 3:
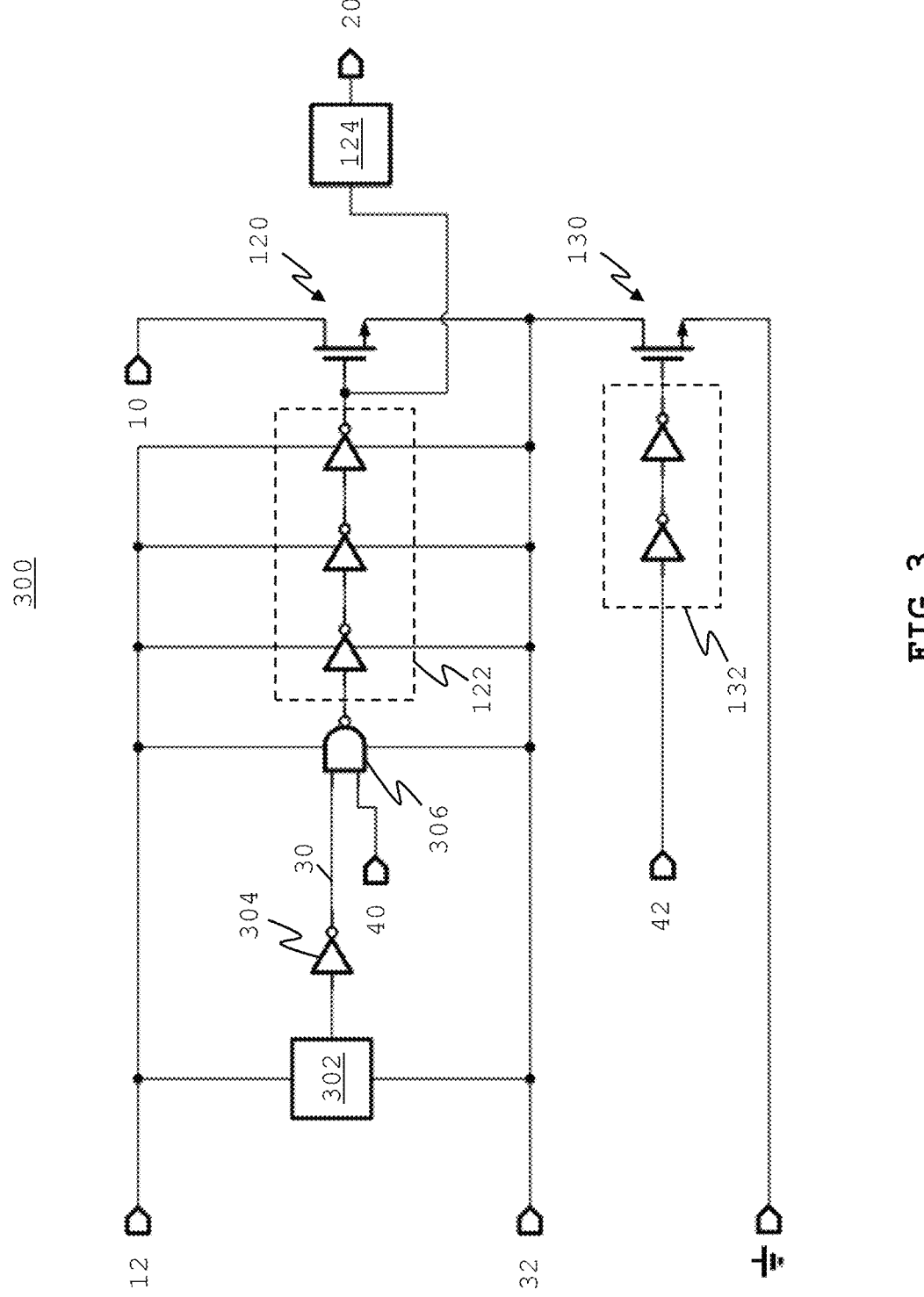
FIG. 3 shows a schematics of a BOOT UVLO circuit according to an embodiment.

FIG. 3 shows an example embodiment of a BOOT UVLO circuit 300. The BOOT UVLO circuit 300 of FIG. 3 may be similar or identical to the BOOT UVLO circuit 300 shown in FIG. 1 and FIG. 2. FIG. 3 shows the high-side switch 120 and its gate driver circuit 122, the low-side switch 130 and its gate driver circuit 132, the HS $V_{GS}$ detection element 124 and the BOOT UVLO detection element 302. The following voltage signals are shown: $V_{in}$ 10; BOOT voltage 12; SW 32; HSON signal 40; LSON signal 42 and HSOK signal 20. Further shown are the logic gates 304, 306, in this example a NOT gate 304 and a NAND gate 306, to immediately switch off the high-side switch 120 in case of an UVLO event, even when the HSON signal 40 is ON.

In an embodiment, the high-side switch 120 and the low-side switch 130 may be implemented as FETs, e.g., NMOS power MOSFETs.

The logic signals used in the BOOT UVLO circuit 300 may be implemented in any suitable manner, e.g., using 5V/0V signals for ON/OFF signals. In this disclosure, ON signals are also referred to as high signals and OFF signals are also referred to as low signals. By using a 5V HSON signal and the HSFET ON detect signal, a BOOT UVLO detection logic algorithm may be used by the logic element 400 to detect when the system enters and exits the BOOT UVLO condition. A BOOT UVLO circuit, including the BOOT UVLO detection element 302, may be placed in parallel with the high-side gate driver 122 and is arranged to immediately shut off the high-side switch 120 when the UVLO threshold is triggered, i.e., it does not wait for a signal from a converter logic to shut off.

The BOOT UVLO circuit 300 may be arranged in the BOOT/SW floating domain and may be arranged to directly shut off the high-side switch 120 whenever a low BOOT voltage is detected. There is no need for a level shifter or level translation circuit to indicate that a BOOT UVLO event has been detected, such as typically used in existing systems.

Figure 4:
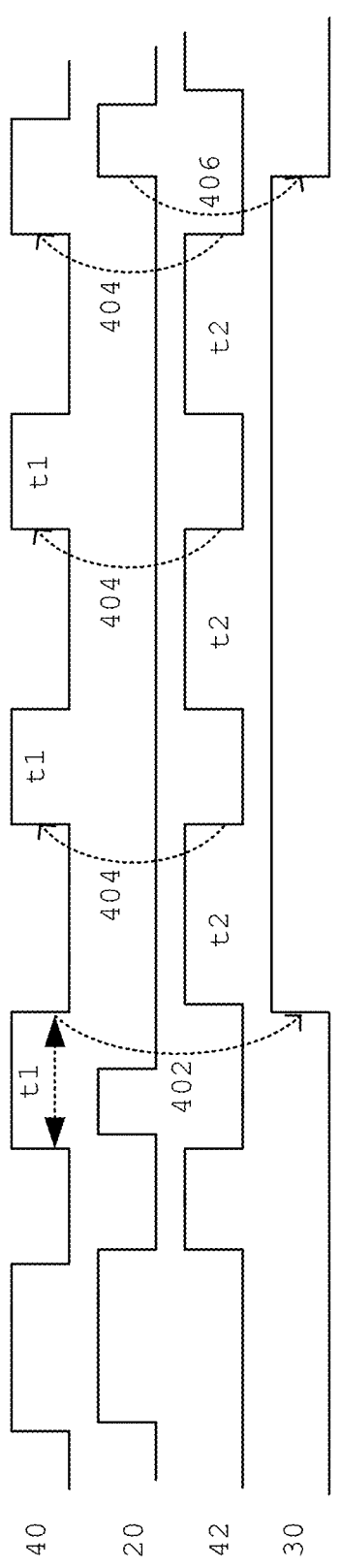
FIG. 4 shows a graph of signals in time according to an embodiment.

When an UVLO event has been detected and the high-side switch 120 has been switched off via the BOOT UVLO detection element 302, the logic element 400 is triggered to activate charging of the bootstrap capacitor 140. FIG. 4 shows example waveforms of the logic signals in the BOOT UVLO circuit 300 and how a logic algorithm implemented in the logic element 400 may allow the converter logic to indicate that a BOOT UVLO event has been detected. HSON signal 40 is the signal that tells the high-side gate driver 122 to turn on the high-side switch 120, HSOK signal 20 is the signal that indicates that a high-side switch turn on/off has been detected, UVLO_Z signal 42 is the signal that determines that a BOOT UVLO event has been detected, and LSON signal 42 is the signal that tells the low-side gate driver 132 to turn on the low-side switch 130.

The logic element 400 may detect that a BOOT UVLO condition has occurred by analyzing the HSON signal 40 and the HSOK signal 20. In the example of FIG. 4, when the HSOK signal 40 is low any time after a time t1 of the HSON signal 40 being high, e.g., with a t1=100 ns, the logic element 400 may determine that the BOOT UVLO condition occurred. The UVLO event being detected by the logic element 400 is indicated by the arrow 402. Indeed, at the arrow 402, the HSON signal 40 is high triggering the high-side switch 120 to be turned on, but the HSOK signal 20 indicates that the high-side switch 120 is in fact turned off as a result of the UVLO_Z signal 30 being activated.

Once the logic element 400 detects the UVLO condition, a series of pulses may begin to charge the bootstrap capacitor. Such series of pulses may include one or more on time periods t1 for the HSON signal 40 each followed by an on time period t2 for the LSON signal 42. Arrows 404 indicate a t1 followed by a t2 period. The on time periods t1 and t2 may be set depending on the configuration of the buck converter and should be set such to allow the bootstrap capacitor to be charged in case of UVLO. In a preferred embodiment, t1 is set to 100 ns and t2 is set to a minimum 300 ns.

The one or more repeated pattern of HSON signals 40 and LSON signals 42 may charge up the bootstrap capacitor 140 until BOOT UVLO exit is detected. The logic element 400 may detect that the BOOT UVLO conditions stops when the HSOK signal 20 goes high while the HSON signal 40 is high, as is the case at arrow 406. At this point in time, the UVLO_Z signal 30 has become low. Indeed, when it has been detected that the high-side switch 120 has turned on again (i.e., the HSOK signal is high while the HSON signal 40 is high), the BOOT UVLO circuit has released the high-side switch 120 by turning off the UVLO_Z signal 30 and the UVLO condition has ended.

Figure 5:
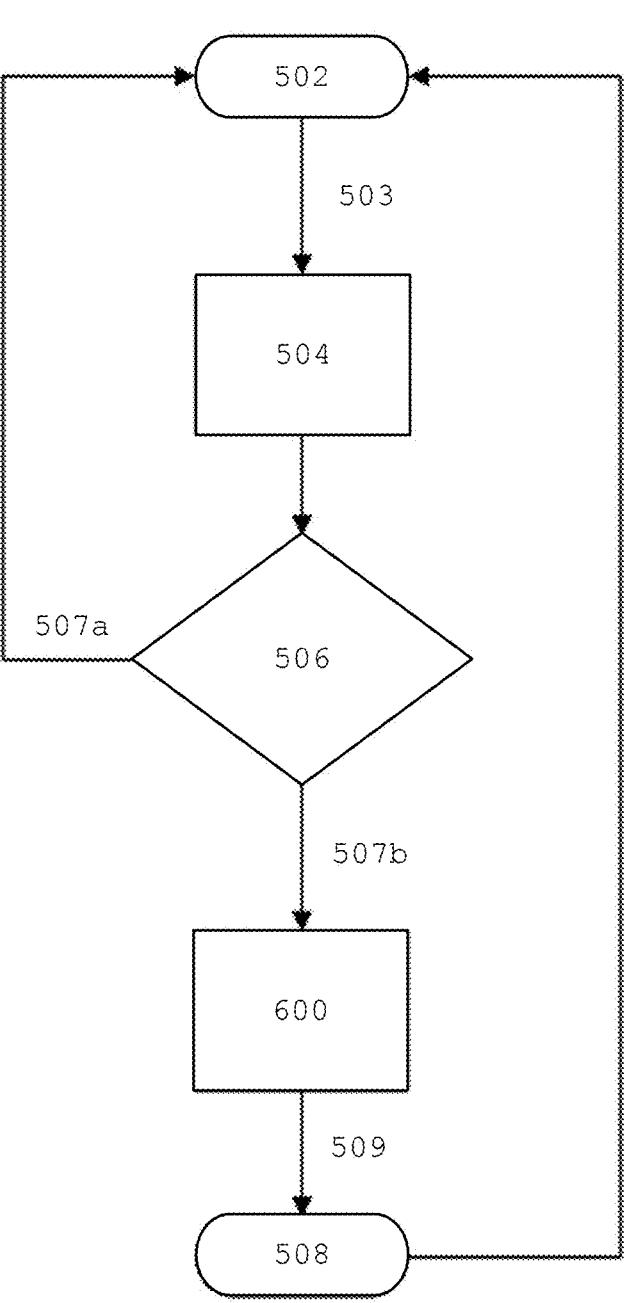
FIG. 5 shows an example embodiment of a process performed by a logic element according to an embodiment.

As explained above, the logic element 400 may be configured to control the high-side switch 120 and the low-side switch 130 depending on the UVLO condition. FIG. 5 shows a flow chart of an example embodiment of an operation 500 of the logic element 400. State 502 indicates that the boot UVLO circuit 300 (and the buck converter 100, 200) are operating in 'normal operation', i.e., when there is no UVLO condition. The logic element 400 may then output an HSON=high signal 503 to turn on the high-side switch 120. After a preset delay 504, e.g., a t1=100 ns, the HSOK signal 20 received from the HS $V_{GS}$ detection element 124 may be determined in step 506. If the HSOK signal 20 is high (note that the HSON signal 40 is high at this moment as well), then the system stays in the normal operation 502, as depicted by the arrow 507a. If on the other hand the HSOK signal 20 is low (the HSON signal 40 is high at this moment), the high side switch 120 has been turned off by a UVLO_Z signal 30 and the logic element 400 starts a BOOT refresh algorithm 600, as depicted by the arrow 507b. The BOOT refresh algorithm 600 enables the bootstrap capacitor 140 to charge, after which the BOOT refresh is done in step 508 and the system returns to the normal state 502.

Figure 6:
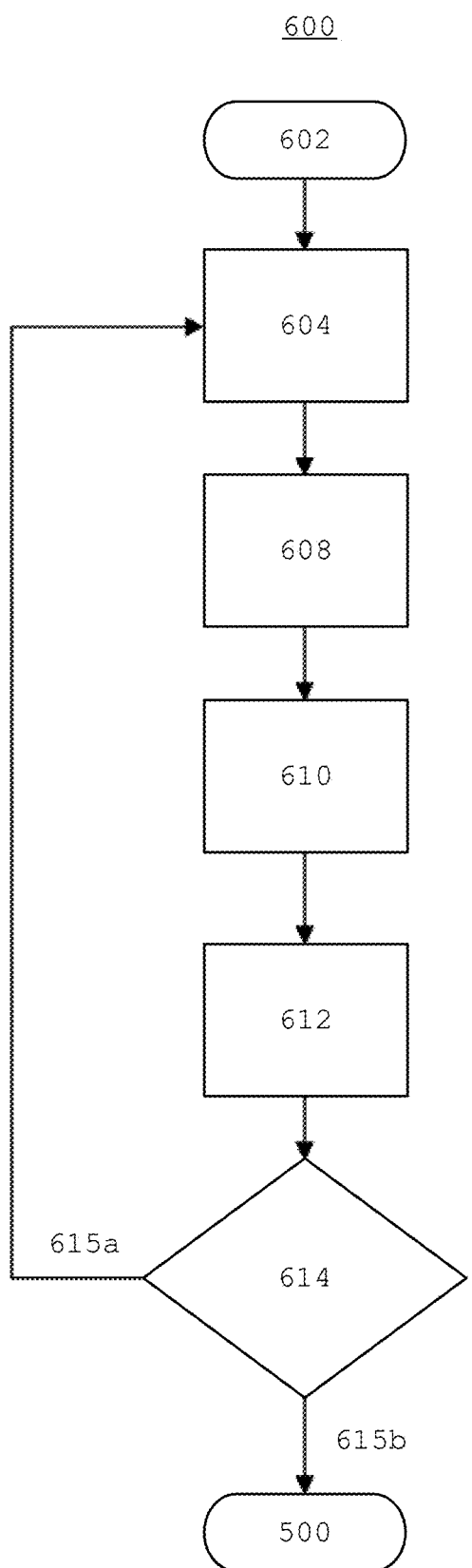
FIG. 6 shows an example embodiment of a further process performed by a logic element according to an embodiment.

FIG. 6 shows a flow chart of an example embodiment of the BOOT refresh algorithm 600 as performed by the logic element 400. The BOOT refresh algorithm 600 starts when a BOOT UVLO has been detected in step 602, e.g., using the operation 500 of FIG. 5. In step 604 the LSON signal 42 may be turned on to turn the low-side switch 130 on. Note that at this stage the high-side switch 120 is turned off because of the UVLO condition. After a preset delay 608, e.g., a delay of t2=300 ns, the HSON signal 40 may be turned on in step 610 to try to turn on the high-side switch 120. Note that the high-side switch 120 will only turn on at this stage when the UVLO condition has stopped and the UVLO_Z signal 30 is OFF. After a preset delay 612, e.g., a delay of t1=100 ns, the HSOK signal 20 received from the HS $V_{GS}$ detection element 124 may be determined in step 614. If the HSOK signal 20 is low (note that the HSON signal 40 is high at this moment), then the system stays in the BOOT UVLO condition, as depicted by the arrow 615a. If on the other hand the HSOK signal 20 is high (the HSON signal 40 is high at this moment as well), the high side switch 120 has been turned off by a UVLO_Z signal 30 and the logic element 400 may return to the normal operation 500. Typically, when the HSON signal 40 is turned ON the LSON signal 42 is turned OFF and vice versa, such as shown in FIG. 4.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope thereof.

The invention claimed is:

1. A buck converter comprising:
a high-side switch;
a low-side switch; and
a bootstrap (BOOT) under-voltage lockout (UVLO) circuit,
wherein the BOOT UVLO circuit comprises:
a BOOT UVLO detection element configured to compare a BOOT voltage with a switch node (SW) voltage to determine an occurrence of a BOOT UVLO event, wherein the BOOT UVLO detection element is configured to output an UVLO signal (UVLO_Z), in case of the BOOT UVLO event; and
a logic gate configured to receive the UVLO_Z and a high-side ON (HSON), signal;
wherein the HSON signal is for controlling a switching of the high-side switch; and
wherein the logic gate is configured to negate the HSON signal when receiving the UVLO_Z while the HSON signal is ON, to thereby switch OFF the high-side switch when the HSON signal is ON.

2. The buck converter according to claim 1, further comprising:
a gate driver circuit,
wherein the logic gate has an output that is an input to the gate driver circuit, and
wherein the gate driver circuit has an output that is an input to a gate of the high-side switch.

3. The buck converter according to claim 1, wherein the high-side switch has a source that is connected to the BOOT UVLO circuit via the SW.

4. The buck converter according to claim 1,
wherein the high-side switch has a gate that is connected to an input of a high-side (HS) gate-source voltage ($V_{GS}$) detection element configured to detect whether the high-side switch is turned ON or OFF based on the $V_{GS}$; and
wherein the $V_{GS}$ detection element is configured to output a high-side OK (HSOK) signal indicative of the high-side switch being turned ON or OFF.

5. The buck converter according to claim 2, wherein the high-side switch has a source that is connected to the BOOT UVLO circuit via the SW.

6. The buck converter according to claim 4, further comprising a logic element, wherein the logic element is configured to:
detect, based on the HSOK signal, that the high-side switch is turned OFF while the HSON signal is ON; and
start a BOOT refresh algorithm when it is detected that the high-side switch is turned OFF while the HSON signal is ON.

7. The buck converter according to claim 6, wherein the BOOT refresh algorithm is configured to sequentially:
switch ON the low-side switch using a low-side ON (LSON) signal;
try to switch ON the high-side switch using the HSON signal; and
determine, based on the HSOK signal, whether the high-side switch is turned ON.

8. The buck converter according to claim 7, wherein the BOOT refresh algorithm is configured to repeat the sequential steps until it is determined, based on the HSOK signal, that the high-side switch is turned ON.

9. The buck converter according to claim 7, wherein the BOOT refresh algorithm is configured to:
apply a first time delay after switching ON the low-side switch using the LSON signal; and
apply a second time delay after trying to switch ON the high-side switch using the HSON signal.

10. The buck converter according to claim 8, wherein the BOOT refresh algorithm is configured to:
apply a first time delay after switching ON the low-side switch using the LSON signal; and
apply a second time delay after trying to switch ON the high-side switch using the HSON signal.

11. The buck converter according to claim 10, wherein the first time delay is about 300 ns and the second time delay is about 100 ns.

12. A method of detecting a bootstrap (BOOT), undervoltage lockout (UVLO), event in a buck converter, the method comprising the steps of:

detecting, based on a high-side OK (HSOK) signal indicative of a high-side switch of the buck converter being turned ON or OFF, that the high-side switch is turned OFF while a high-side ON (HSON) signal for controlling the switching of the high-side switch is ON; and starting a BOOT refresh algorithm when it is detected that the high-side switch is turned OFF while the HSON signal is ON.

13. The method according to claim 12, wherein the BOOT refresh algorithm comprises sequentially:

switching ON a low-side switch of the buck converter using a low-side ON (LSON) signal;

trying to switch ON the high-side switch using the HSON signal; and determining, based on the HSOK signal, whether the high-side switch is turned ON.

14. The method according to claim 13, wherein the BOOT refresh algorithm further comprises repeating the sequential steps until it is determined, based on the HSOK signal, that the high-side switch is turned ON.

15. The method according to claim 13, wherein the BOOT refresh algorithm further comprises:

applying a first time delay after switching ON the low-side switch using the LSON signal; and applying a second time delay after trying to switch ON the high-side switch using the HSON signal.

16. The method according to claim 14, wherein the BOOT refresh algorithm further comprises:

applying a first time delay after switching ON the low-side switch using the LSON signal; and applying a second time delay after trying to switch ON the high-side switch using the HSON signal.

17. The method according to claim 15, wherein the first time delay is about 300 ns and the second time delay is about 100 ns.

* * * * *